US012659576B2

(12) United States Patent
Chen et al.

(10) Patent No.:    US 12,659,576 B2
(45) Date of Patent:        Jun. 16, 2026

(54) MOTION-DETECTION SYSTEM AND MOTION-DETECTION METHOD

(71) Applicant: Nuvoton Technology Corporation, Hsinchu Science Park (TW)

(72) Inventors: Wei-Zong Chen, Taoyuan City (TW); Tzu-Lan Shen, Taoyuan City (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 201 days.

(21) Appl. No.: 18/390,141

(22) Filed: Dec. 20, 2023

(65) Prior Publication Data

US 2024/0214672 A1      Jun. 27, 2024

(30) Foreign Application Priority Data

Dec. 21, 2022    (TW) .................................. 111149144

(51) Int. Cl.
| | |
|---|---|
| *H04N 23/65* | (2023.01) |
| *G06T 7/223* | (2017.01) |
| *G06V 10/82* | (2022.01) |
| *H04N 23/61* | (2023.01) |
| *H04N 23/667* | (2023.01) |
| *H04N 23/84* | (2023.01) |

(52) U.S. Cl.
CPC ........... *H04N 23/651* (2023.01); *G06T 7/223* (2017.01); *H04N 23/61* (2023.01); *H04N 23/84* (2023.01); *G06T 2207/10024* (2013.01); *G06T 2207/20021* (2013.01); *G06T 2207/20084* (2013.01); *G06V 10/82* (2022.01); *H04N 23/667* (2023.01)

(58) Field of Classification Search
CPC ...... H04N 23/651; H04N 23/61; H04N 23/84; H04N 23/667; H04N 25/10; G06T 7/223; G06T 2207/10024; G06T 2207/20021; G06T 2207/20084; G06T 7/20; G06T 1/20; G06T 7/215; G06V 10/82
See application file for complete search history.

(56) References Cited

U.S. PATENT DOCUMENTS

| | | | | |
|---|---|---|---|---|
| 6,727,938 B1 * | 4/2004 | Randall | ............ | G08B 13/19606 |
| | | | | 348/E7.087 |
| 2004/0233282 A1 * | 11/2004 | Stavely | ............ | G08B 13/19663 |
| | | | | 348/154 |
| 2019/0222756 A1 * | 7/2019 | Moloney | ................ | H04N 23/45 |

(Continued)

*Primary Examiner* — Timothy J Henn
(74) *Attorney, Agent, or Firm* — MUNCY, GEISSLER, OLDS & LOWE, P.C.

(57) ABSTRACT

A motion-detection system including a camera and a storage device is provided. The camera captures a color image and transmits the color image to a pre-processor. In a low-power mode, the pre-processor retrieves the luminance value of each pixel in the color image to generate a luminance image and performs resolution reduction on the luminance image to generate an input image. The motion-identifying device identifies a motion-object block within the input image and calculates the amount of movement of the motion-object block. When the amount of movement reaches an identification threshold, the motion-detection system enters a normal mode from the low-power mode. In the normal mode, when an object-identifying model determines that an object in the motion-object block is not a predefined object, the motion-detection system enters the low-power mode.

10 Claims, 8 Drawing Sheets

(56) References Cited

U.S. PATENT DOCUMENTS

| | | | | |
|---|---|---|---|---|
| 2021/0344881 | A1* | 11/2021 | Wu | H04N 7/188 |
| 2022/0148198 | A1 | 5/2022 | Kobayashi | |
| 2022/0239868 | A1* | 7/2022 | Lee | H04N 23/65 |
| 2022/0394171 | A1* | 12/2022 | Dayana | H04N 23/61 |
| 2023/0077868 | A1* | 3/2023 | Burns | B60R 25/305 |
| | | | | 348/148 |
| 2023/0154296 | A1* | 5/2023 | Jacob | G06T 7/11 |
| | | | | 348/143 |

* cited by examiner

100

<u>200</u>

Capturing a color image using a camera, and transmitting the color image to a pre-processor via a camera interface. While in a low-power mode, the pre-processor retrieves a luminance value of each pixel in the color image to generate a luminance image and performs a resolution reduction on the luminance image to generate an input image   ~210

Storing the input image using a storage device, and transmitting the input image to a motion-identifying device; wherein, the motion-identifying device is configured to identify a motion-object block within the input image   ~220

The motion-identifying device calculates an amount of movement of the motion-object block. When the amount of movement reaches an identification threshold, a system wake-up signal is triggered to cause the motion-detection system to enter a normal mode from the low power mode   ~230

In the normal mode, an object-identifying model is configured to determine whether an object in the motion-object block is a predefined object. When the object-identifying model determines that the object in the motion object block isn't the predefined object, the motion-detection system enters the low-power mode again, and the motion-object block is transmitted to the pre-processor   ~240

FIG. 2A

IMG

IMG

IMG

MOTION-DETECTION SYSTEM AND MOTION-DETECTION METHOD

CROSS REFERENCE TO RELATED APPLICATIONS

This application claims priority of Taiwan Patent Application No. 111149144, filed on Dec. 21, 2022, the entirety of which is incorporated by reference herein.

BACKGROUND OF THE INVENTION

Field of the Invention

The present invention relates to motion-detection systems and motion-detection methods, and, in particular, to power-saving motion-detection systems and motion-detection methods.

Description of the Related Art

The detection of moving objects has been an important aspect of the field of computer vision. Detectable motion in a scene can be observed by the human eye, and this characteristic of image vision may cause change in a video image. According to experimental results, we can say that the changing parts of a video image are usually caused by moving objects, and the main purpose of moving-object detection is to find these changing parts. Some major methods of moving-object detection used in the past are introduced below.

Temporal Differencing: in the continuous images, two images separated by two or three images are subtracted from each other. If the difference is zero, it means that this pixel doesn't belong to a moving object. If the difference isn't zero, it means that this pixel belongs to a moving object, and the result of subtraction is used to identify areas in which there is movement. Temporal Differencing requires less computation than Optical Flow and is more suitable for use in real-time applications. However, this method takes up a large amount of memory, the microprocessor part is also more difficult to implement.

Background Subtraction: Background Subtraction is easy to implement and widely used, especially when dealing with static scenes. First, a reference background is established. Then, the reference background is subtracted from the current image, so as to remove the same parts of the background, and the remaining part is the area of the moving object. Because the entire image is moving under the moving background, how to separate the background from the foreground (the area of the moving object) has to be considered. It can be observed that the difference between background and foreground is that the motion vectors contained in the background are the same, and the motion vectors of the foreground are irregular. Also, the background occupies most of the area in the image. It can therefore be inferred that the motion vector having the largest number is a background. Using this property, the motion vector of each block can be found using the block-matching method. An almost static background can be obtained by finding the motion vector having the largest number, taking that vector as a global motion vector, and using the global motion vector to compensate for the moved background. Then, the area of the moving object can be ascertained using Temporal Differencing. However, this method is too memory- and time-consuming.

Thus, how to effectively detect moving objects in images has become one of the issues that need to be addressed in this field.

BRIEF SUMMARY OF THE INVENTION

To solve aforementioned problem, an embodiment of the present disclosure provides a motion-detection system, which comprises a camera and a storage device. The camera is configured to capture a color image and transmit the color image to a pre-processor through a camera interface; wherein, in a low-power mode, the pre-processor retrieves a luminance value of each pixel in the color image to generate a luminance image and performs a resolution reduction on the luminance image to generate an input image. The storage device is configured to store the input image and transmit the input image to a motion-identifying device. The motion-identifying device is configured to identify the motion-object block within the input image. The motion-identifying device calculates an amount of movement of the motion-object block. When the amount of movement reaches an identification threshold, a system wake-up signal is triggered, causing the motion-detection system to enter a normal mode from the low-power mode. In the normal mode, when an object-identifying model determines that an object in the motion-object block is not a predefined object, the motion-detection system enters the low-power mode again, and the motion-object block is transmitted to the pre-processor.

In an embodiment, the pre-processor cuts the input image into a plurality of sub-images and selects a predefined number of sub-images to input to the storage device.

In an embodiment, the storage device is a low-power static random access memory (LPSRAM).

In an embodiment, the motion-identifying device receives a first input image and a second input image, calculates an amount of difference between the first input image and the second input image and regards the amount of difference as the amount of movement so as to identify the motion-object block within the input image and to mark a position of the motion-object block.

In an embodiment, when the motion-identifying device determines that the amount of difference between the first input image and the second input image exceeds the identification threshold, the motion-identifying device triggers the system wake-up signal so as to cause the motion-detection system to enter the low-power mode from the normal mode.

In an embodiment, the object-identifying model is a neural-network processing unit (NPU).

In an embodiment, wherein when the object-identifying model determines that the object in the motion-object block isn't the predefined object, the motion-detection system enters the low-power mode again, the motion-object block is transmitted to the pre-processor, and the pre-processor masks the motion-object block to generate a mask image and transmits the mask image to the storage device to replace the input image.

To solve the aforementioned problem, another embodiment of the present disclosure provides a motion-detection method, which comprises capturing a color image using a camera and transmitting the color image to a pre-processor through a camera interface. In a low-power mode, the pre-processor retrieves the luminance value of each pixel in the color image to generate a luminance image and performs a resolution reduction on the luminance image to generate an input image. The motion-detection method comprises storing the input image using a storage device and transmitting the input image to a motion-identifying device. The motion-identifying device is configured to identify a motion-object block within the input image. The motion-identifying device calculates an amount of movement of the motion-object block. When the amount of movement reaches an identification threshold, a system wake-up signal is triggered, causing the motion-detection system to enter a normal mode from the low-power mode. In the normal mode, when an object-identifying model determines that an object in the motion-object block is not a predefined object, the motion-detection system enters the low-power mode again, and the motion-object block is transmitted to the pre-processor.

In an embodiment, the motion-detection method further comprises cutting the input image into a plurality of sub-images and selecting a predefined number of sub-images to input to the storage device using the pre-processor.

In an embodiment, the storage device is a low-power static random access memory (LPSRAM).

In an embodiment, the motion-identifying device receives a first input image and a second input image. The motion-identifying device calculates an amount of difference between the first input image and the second input image, regarding the amount of difference as the amount of movement so as to identify the motion-object block within the input image, and marking a position of the motion-object block.

In an embodiment, when the amount of difference between the first input image and a the second input image exceeds the identification threshold using the motion-identifying device, a system wake-up signal is triggered, to cause the motion-detection system to enter the low-power mode from the normal mode.

In an embodiment, the object-identifying model is a neural-network processing unit (NPU).

In an embodiment, when the object-identifying model determines that the object in the motion-object block isn't the predefined object, the motion-detection system enters the low-power mode again. The motion-object block is transmitted to the pre-processor. The pre-processor masks the motion-object block to generate a mask image and transmits the mask image to the storage device to replace the input image.

Based on the description above, the motion-detection system and the motion-detection method of the present disclosure can reduce the amount of computation. It does this by performing various processes on the color image while in low-power mode, using the pre-processor to generate a light-weighted input image (e.g. a sub-image), switching to normal mode only when the motion-identifying device determines that the input image contains a moving object, and switching back to the low-power mode when an object which is able to be masked is found, wherein the input image is replaced with the mask image. In this way, by performing image pre-processing in the low-power mode, the computation data is light-weighted, and the required power consumption of the whole system is reduced. Thus, the problems of calculation consumption and insufficient storage space are addressed.

BRIEF DESCRIPTION OF THE DRAWINGS

The present invention can be more fully understood by reading the subsequent detailed description and examples with references made to the accompanying drawings, wherein:

FIG. 2A is a schematic diagram of a motion-detection method according to an embodiment of the present disclosure;

DETAILED DESCRIPTION OF THE INVENTION

The following description is made for the purpose of illustrating the general principles of the invention and should not be taken in a limiting sense. The scope of the invention is best determined by reference to the appended claims.

It should be understood that the terms "include" and "comprise" used in the specification are used to describe the existence of particular technical features, values, method steps, operation processing, components, and/or assemblies and do not exclude adding more technical features, values, method steps, operation processing, components, assemblies, or any combination of the above.

The terms "first", "second, and "third" used in the claims are configured to modify the components in the claims and are not configured to represent the priority order, prior relationship, or one component ahead of another component therebetween, or the time order when performing the method steps. Those terms are only configured to distinguish components with the same name.

Figure 1:
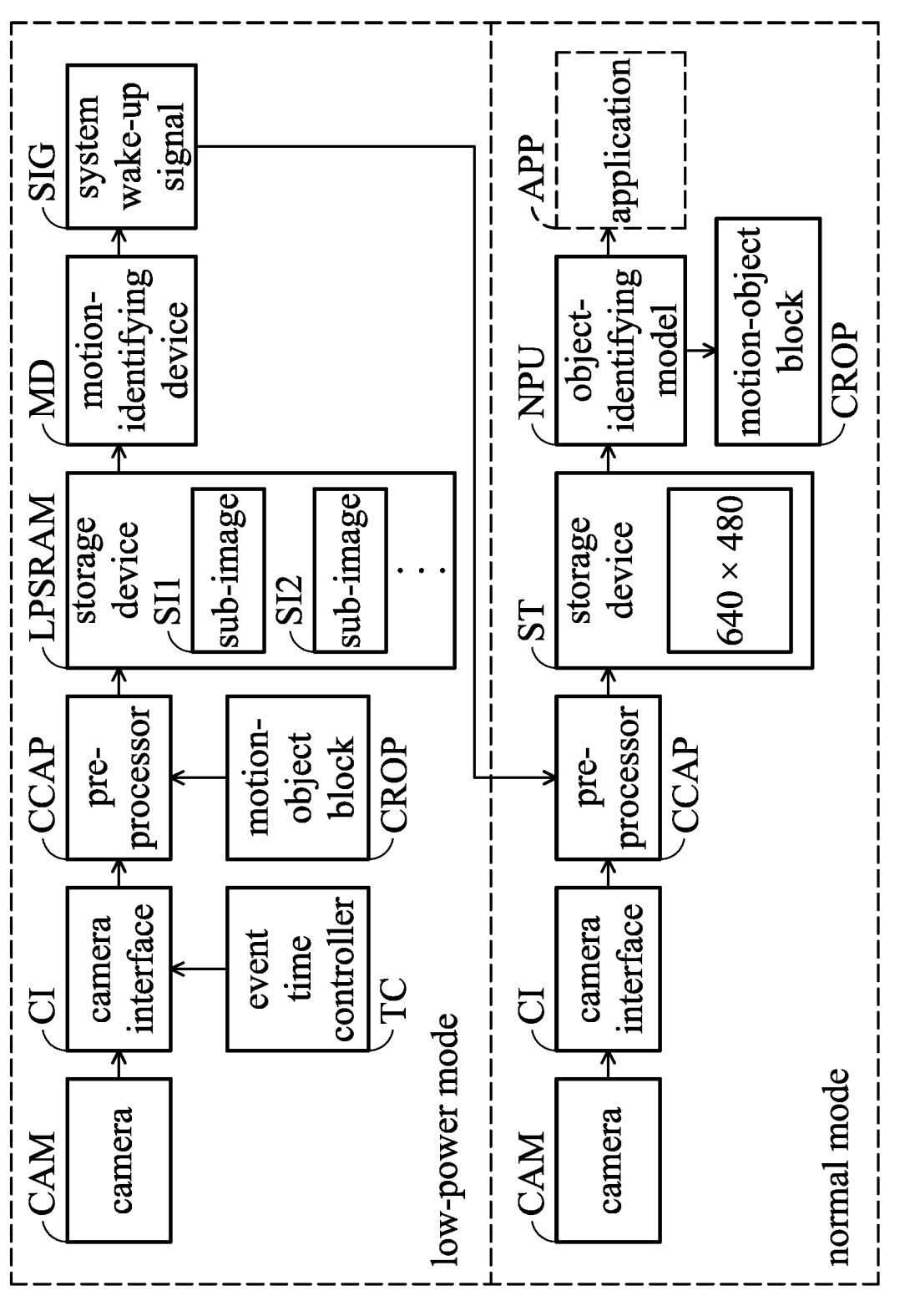
FIG. 1 is a schematic diagram of a motion-detection system according to an embodiment of the present disclosure.
Figure 2B:
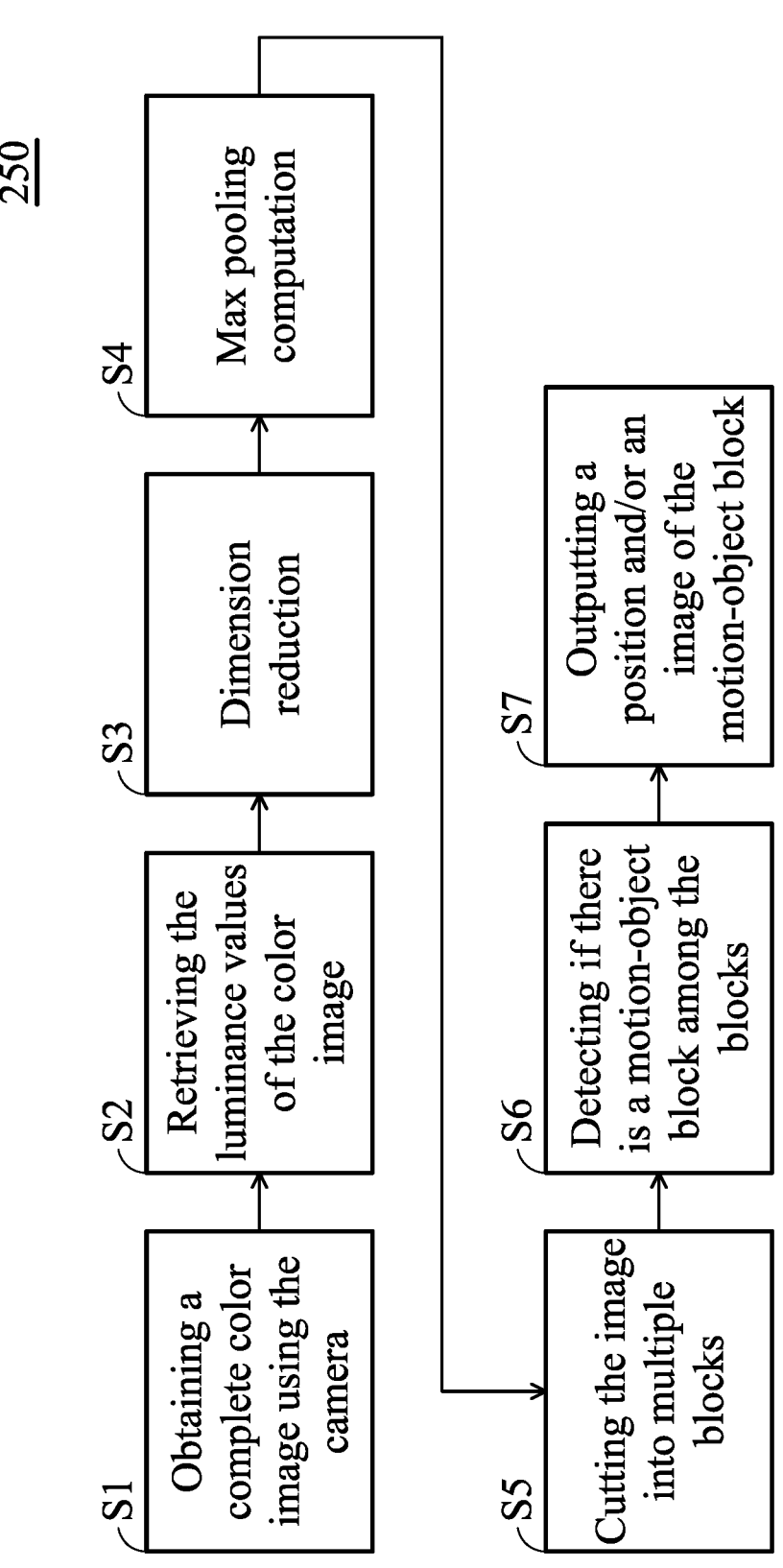
FIG. 2B is a schematic diagram of an image processing method according to an embodiment of the present disclosure.

Please refer to FIGS. 1, 2A, and 2B. FIG. 1 is a schematic diagram of a motion-detection system 100 according to an embodiment of the present disclosure. FIG. 2A is a schematic diagram of a motion-detection method 200 according to an embodiment of the present disclosure. FIG. 2B is a schematic diagram of an image processing method 250 according to an embodiment of the present disclosure. In an embodiment, the motion-detection system 100 of the present disclosure can be applied to detecting moving objects, such as humans, pets, robot vacuums, or other predefined movable objects.

As shown in FIG. 1, the motion-detection system 100 comprises a camera CAM and a storage device LPSRAM.

In an embodiment, the camera CAM may be implemented by charge-coupled device (CCD) or complementary metal-oxide semiconductor (CMOS).

In an embodiment, the storage device LPSRAM is configured to store various data. For example, the storage device LPSRAM may be a memory, a hard disk, or a USB memory card, etc. . . . .

In an embodiment, the storage device LPSRAM may be a low-power static random access memory (LPSRAM).

In an embodiment, the motion-detection system 100 further comprises a camera interface CI, an event time controller TC, a pre-processor CCAP, a motion-identifying device MD, a storage device ST, an object-identifying model NPU, etc. . . . . .

In an embodiment, each component in FIG. 1 may use one or more processors as a central processor to perform algorithms and control the time point of triggering events or component execution.

In an embodiment, the storage device ST and the storage device LPSRAM are in one processor, and the object-identifying model NPU is in another processor (or an AI accelerator). These two processors are electrically connected and may exchange information with each other.

In an embodiment, the same or different cameras CAM, storage devices LPSRAM, camera interfaces, pre-processors CCAP, and storage devices ST, etc. . . . are used in a low-power mode and a normal mode.

In an embodiment, the event time controller TC is configured to control the transmission or reception frame rate of the camera interface CI, such as a transmission speed of 3 frames per second.

In an embodiment, the pre-processor CCAP may be implemented by a chip.

In an embodiment, the pre-processor CCAP may be implemented by an integrated circuit, such as micro controller, a microprocessor, a digital signal processor, an application specific integrated circuit (ASIC), or a logic circuit.

In an embodiment, the motion-identifying device MD may be implemented by software, firmware, or hardware (a chip or circuit).

In an embodiment, the motion-identifying device MD comprises a processor or another electronic device with computing functions.

In an embodiment, the storage device ST is configured to store various data. For example, the storage device ST may be a memory, a hard disk, or a USB memory card, etc. . . . . .

In an embodiment, the storage device ST is a low-power static random access memory (LPSRAM).

In an embodiment, the object-identifying model NPU is a Neural-network Processing Unit (NPU).

In step 210, a color image is captured by a camera CAM, and the color image is transmitted to a pre-processor CCAP via a camera interface CI. While in a low-power mode, the pre-processor CCAP retrieves a luminance value of each pixel in the color image to generate a luminance image and performs a resolution reduction on the luminance image to generate an input image.

In an embodiment, the pre-processor CCAP cuts the input image into a plurality of sub-images (such as sub-image SI1 and SI2) and selects a predefined number of sub-images to input to the storage device LPSRAM.

In an embodiment, the color image refers to an RGB image (RGB: red, green, blue). The RGB image format may be transformed into a combination of YCbCr through mathematic computation, wherein Y is the luminance, and Cb and Cr are chrominance. Cb is blue chrominance, and Cr is red chrominance. In an embodiment, the pre-processor CCAP retrieves the luminance value (i.e. the "Y" value of each pixel) from the YCbCr image to generate a luminance image. Since a luminance image only contains luminance information, the profile size of the input image can be reduced (or light-weighted).

Moreover, the pre-processor CCAP is further configured to perform resolution reduction (e.g. reducing the resolution of the luminance image) on the luminance image. However, the order of performing resolution reduction and retrieving the luminance value is not limited.

FIG. 2B shows an image processing method 250 that makes a series of adjustments to an image so as to reduce (or light-weighted) the profile size of the input image.

In an embodiment, first, a complete color image is obtained using the camera CAM (step S1). The size of the color image is assumed to be 640×480 (unit: pixel, the same as below). To achieve low-power motion detection, the pre-processor CCAP only retrieves the luminance values of the color image (step S2) and performs down-sampling on the luminance image so as to perform a first stage dimension reduction to obtain an image with an image size of 320×240 (step S3). Then, the pre-processor CCAP performs a max pooling computation on the image (step S4) to obtain an image having smaller dimensions (160×120). Then, the pre-processor CCAP cuts the image evenly into multiple blocks, such as 64 equal blocks of 20×15 each (step S5). Not all of the 64 equal blocks will go to the storage device LPSRAM; only 16 of those blocks will be selected to enter the storage device LPSRAM and used in the computation. The 16 blocks can be selected from among the 64 blocks in a randomized manner. How many resources these blocks will occupy in the memory space of the storage device LPSRAM may be measured in this stage. Then, the motion-identifying device MD detects if there is a motion-object block CROP among the 16 blocks using a known object-detection algorithm (S6). When the motion-identifying device MD detects a motion-object block CROP, the motion-identifying device MD outputs the position and/or an image of the motion-object block CROP (step S7).

Figure 3A:
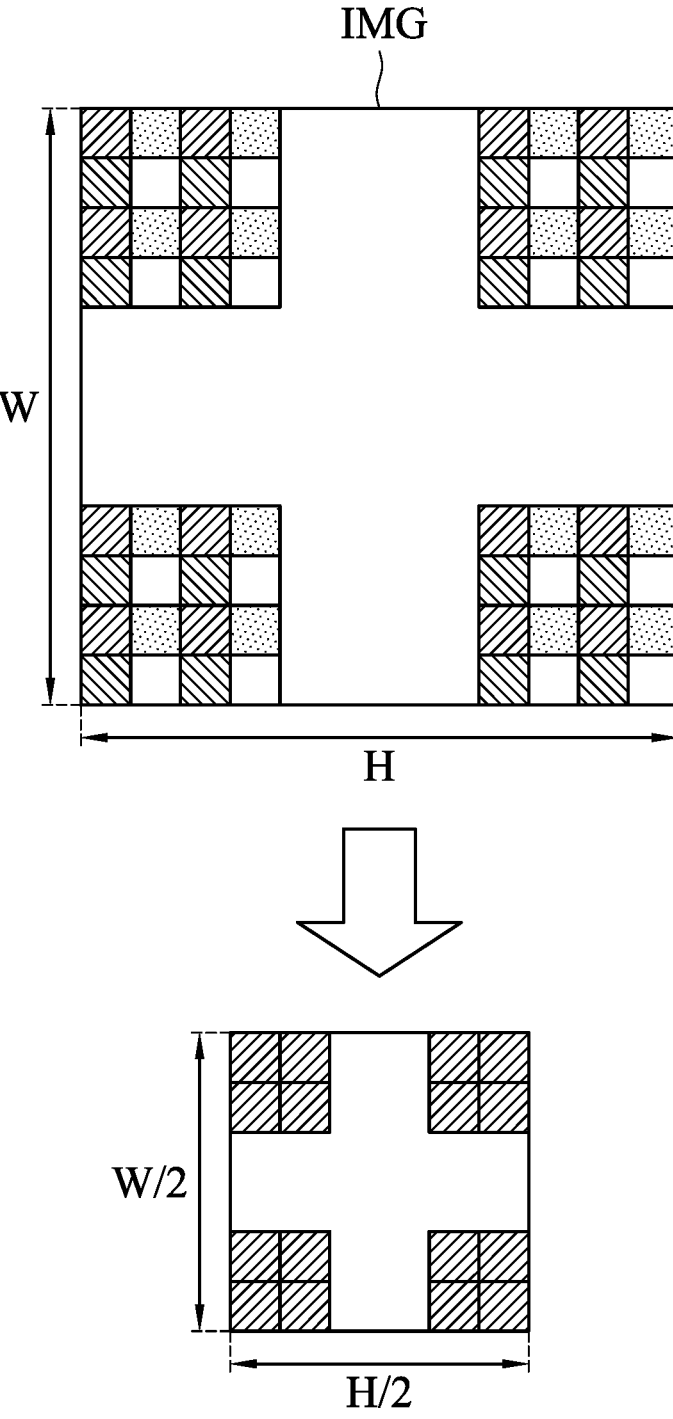
FIGS. 3A-3B show a method for down-sampling according to an embodiment of the present disclosure.
Figure 3B:
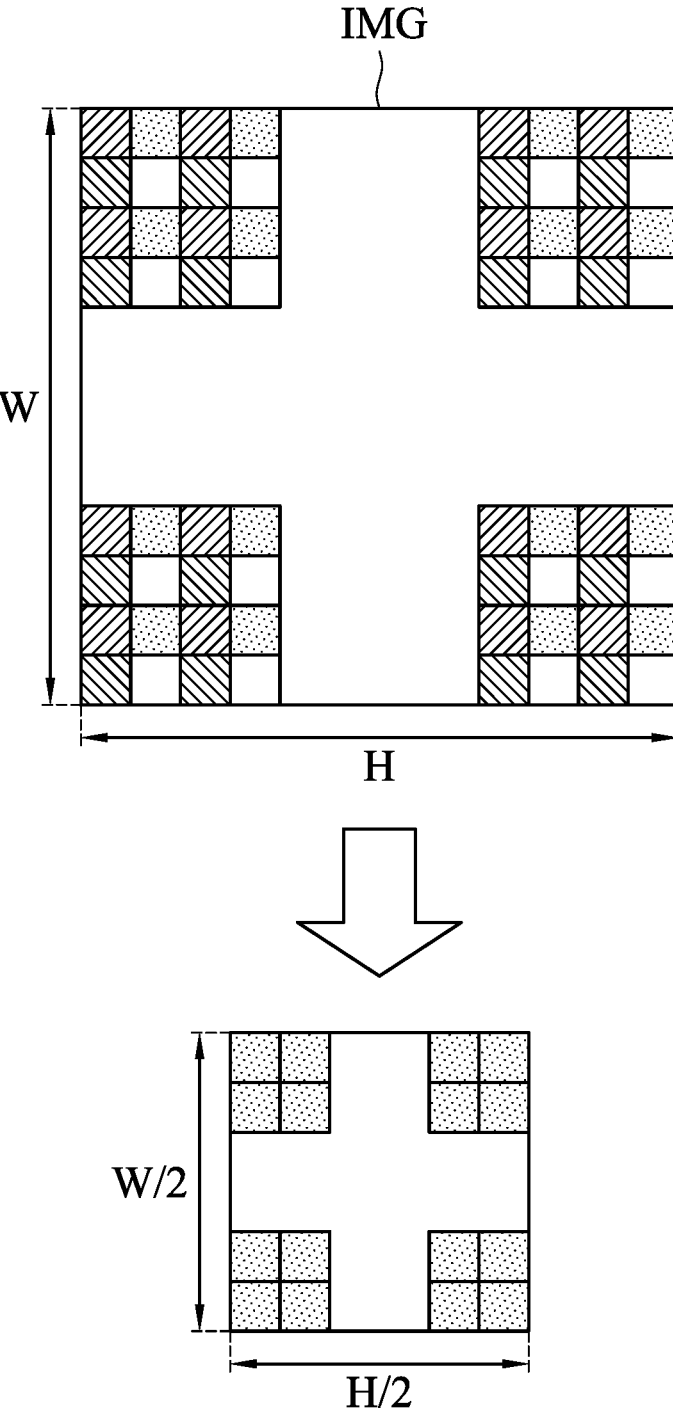

In an embodiment, please refer to FIGS. 3A-3B, which show a method for down-sampling according to an embodiment of the present disclosure. In an embodiment, down-sampling may be performed on any image. A luminance image IMG is used as an example.

In FIGS. 3A-3B, the symbol W in the luminance image IMG refers to length, and the symbol H refers to width. In the down-sampling stage, the pre-processor CCAP may leave an odd or even number of pixels to rapidly reduce the dimensions of the image. An odd number of pixels are left in FIG. 3A, while an even number of pixels are left in FIG. 3B. After down-sampling, the widths and the lengths of both FIG. 3A and FIG. 3B become half of the origin.

Figure 4:
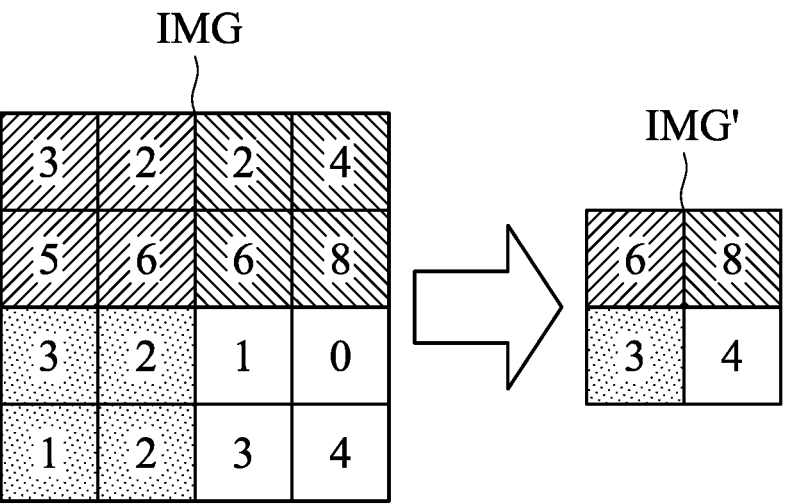
FIG. 4 is a schematic diagram of a pooling method according to an embodiment of the present disclosure.

In an embodiment, please refer to FIG. 4, which is a schematic diagram of a pooling method according to an embodiment of the present disclosure. The concept of deep learning is adapted in the pooling. The pre-processor CCAP leaves the brighter features of a large dimension image (such as the luminance image IMG). The best pooling effect may be obtained using a max pooling algorithm (i.e. using a 2×2 filter, and the stride is 2) (as shown in image IMG'). Pooling is a known algorithm, so it won't be described in detail here.

Figure 5:
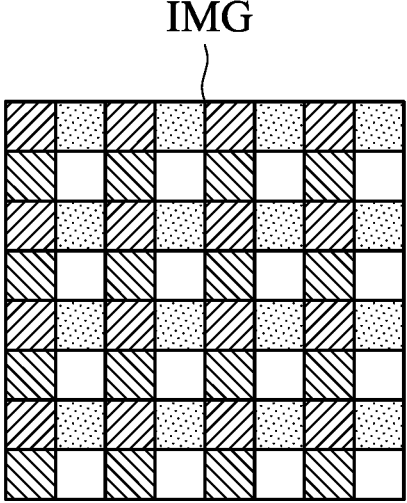
FIG. 5 is a schematic diagram of a method for cutting motion detection blocks according to an embodiment of the present disclosure.

In an embodiment, please refer to FIG. 5, which is a schematic diagram of a method for cutting motion detection blocks according to an embodiment of the present disclosure. The pre-processor CCAP cuts the luminance image IMG into 64 equal blocks. Assuming that the image is 160×120 after the max pooling algorithm, one block of FIG. 5 is 160/8×120/8, i.e. 20×15 pixels.

Figure 6:
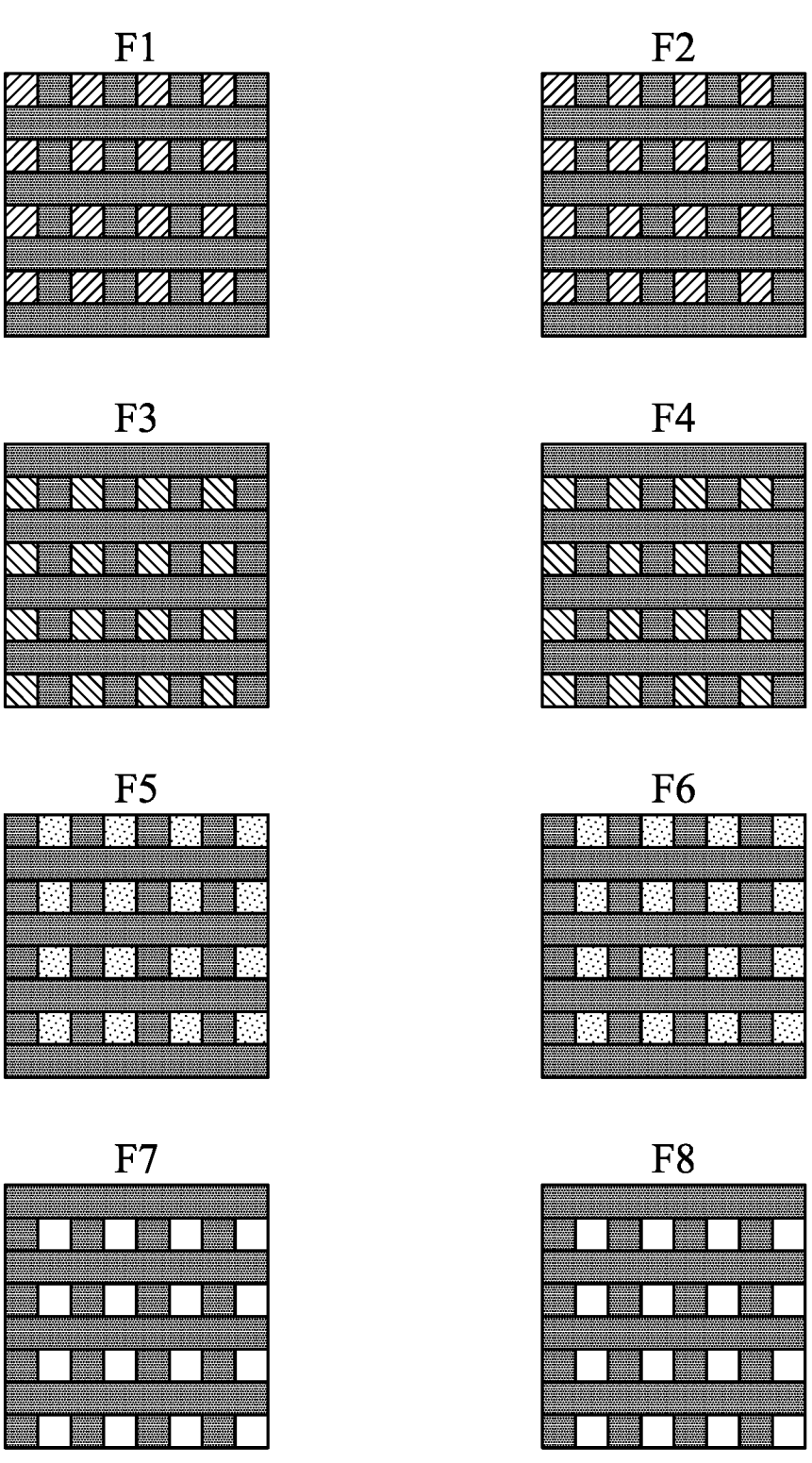
FIG. 6 is a schematic diagram of blocks which enter an analysis phase according to an embodiment of the present disclosure.

In an embodiment, please refer to FIG. 6, which is a schematic diagram of blocks which enter an analysis phase according to an embodiment of the present disclosure. The blocks which enter the analysis phase are those blocks having the same marks as shown in FIG. 5. For example, as shown in FIG. 6, each of the frames F1~F8 has 16 blocks.

In step 220, the input image is stored using a storage device LPSRAM, and the input image is transmitted to a motion-identifying device MD. The motion-identifying device MD is configured to identify the motion-object block CROP within the input image.

In an embodiment, the motion-identifying device MD identifies the motion-object block CROP within the input image using a known object-detection algorithm. Any image algorithm that can identify a predefined object (such as a human, pet, robot vacuum, or another predefined movable object) may be used as the object-detection algorithm, so it won't be described in detail here.

In step 230, the motion-identifying device MD calculates the amount of movement of the motion-object block CROP. When the amount of movement reaches an identification threshold, a system wake-up signal SIG is triggered, causing the motion-detection system 100 to enter the normal mode from the low-power mode.

In an embodiment, when the amount of movement doesn't reach the identification threshold, the motion-identifying device MD doesn't trigger the system wake-up signal SIG, and the motion-detection system 100 stays in the low-power mode.

In an embodiment, the motion-identifying device MD receives a first input image and a second input image, calculates the amount of difference between the first input image and the second input image, and regards the amount of difference as the amount of movement so as to identify the motion-object block CROP included in the input image and to mark the position of the motion-object block CROP.

Figure 7:
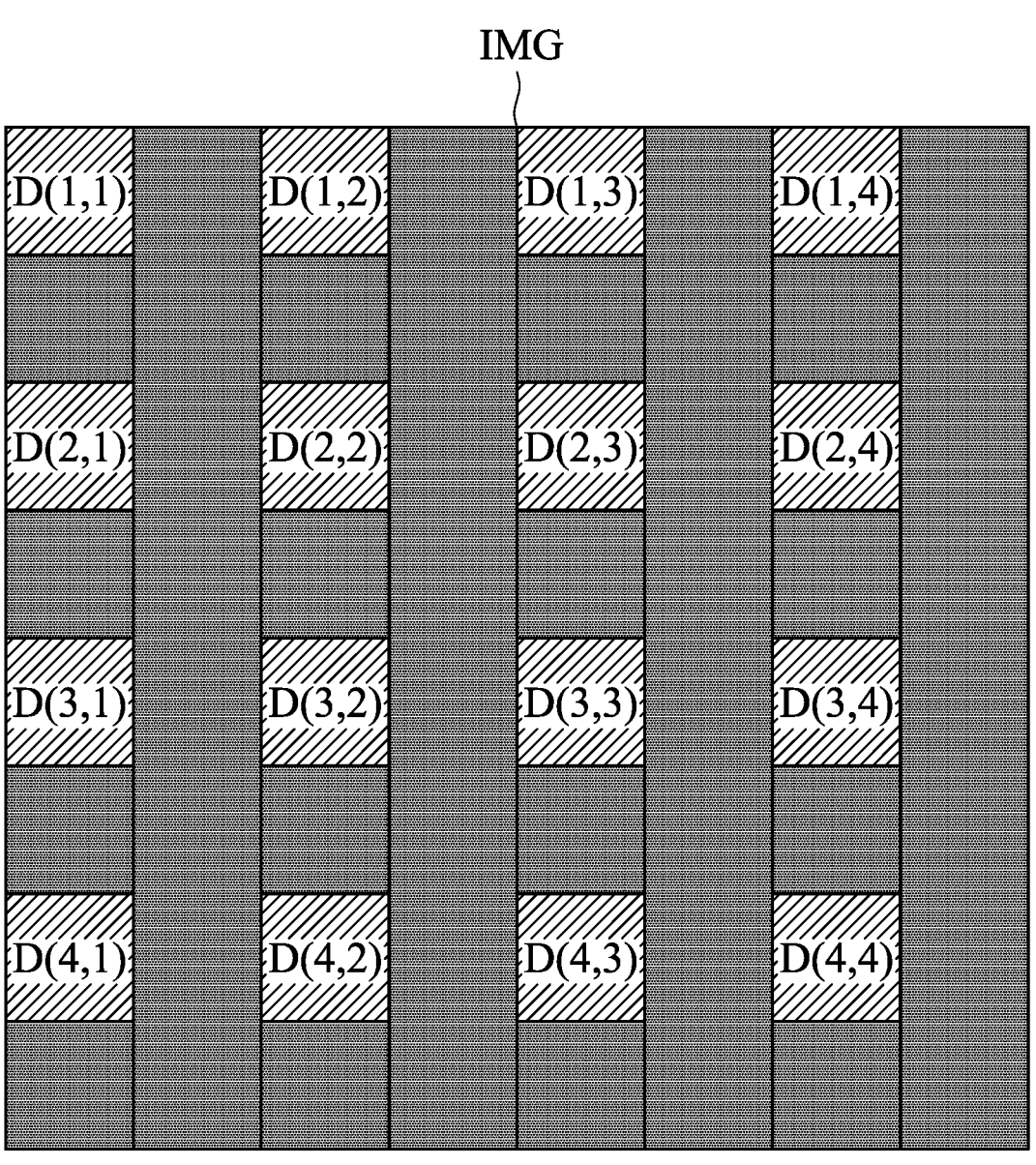
FIG. 7 is a schematic diagram of a method for calculating local motion vectors according to an embodiment of the present disclosure.

In an embodiment, please refer to FIG. 7, which is a schematic diagram of a method for calculating local motion vectors according to an embodiment of the present disclosure. In an embodiment, the local motion vector may represent the amount of movement. The motion-identifying device MD may perform the calculation for measuring similarity using the sum of absolute differences (SAD) to make this determination. The function is described below:

$$D(i, j) = \sum_{w=1}^{M} \sum_{h=1}^{N} |P(w, h) - C(w, h)|$$

wherein the symbol (i, j) is the block number, the symbol (w, h) is the length and width of the sub-image (such as 20×15), the symbol P is the previous frame, and the symbol C is the current frame.

The motion-identifying device MD searches for the lowest mean absolute deviation (MAD) in the window, and it is the local motion vector of this block. After all the blocks have been calculated, the local motion vectors of all the blocks are obtained. If all of the local motion vectors are summed up: SUM=D(1,1)+D(1,2)+D(1,3)+D(1,4)+D(2,1)+D(2,2)+D(2,3)+D(2,4)+D(3,1)+D(3,2)+D(3,3)+D(3,4)+D(4,1)+D(4,2)+D(4,3)+D(4,4), the calculation result SUM is MWSUMn[0:31], n=0, 1, 2, . . . , 15, as defined in the following register in Table 1.

TABLE 1

| MSUM [0:31] | MSUM = MWSUM0[0:31] + MWSUM1[0:31] + . . . + MWSUM15[0:31] |
|---|---|
| MWSUM0[0:31] | MWSUM0[0:31] = D(1, 1) |
| . . . | MWSUM1[0:31] = D(1, 2) |
| MWSUM15[0:31] | MWSUM2[0:31] = D(1, 3) |
|  | MWSUM3[0:31] = D(1, 4) |
|  | MWSUM4[0:31] = D(2, 1) |
|  | MWSUM5[0:31] = D(2, 2) |
|  | MWSUM6[0:31] = D(2, 3) |
|  | MWSUM7[0:31] = D(2, 4) |
|  | MWSUM8[0:31] = D(3, 1) |
|  | MWSUM9[0:31] = D(3, 2) |
|  | MWSUM10[0:31] = D(3, 3) |
|  | MWSUM11[0:31] = D(3, 4) |
|  | MWSUM12[0:31] = D(4, 1) |
|  | MWSUM13[0:31] = D(4, 2) |
|  | MWSUM14[0:31] = D(4, 3) |
|  | MWSUM15[0:31] = D(4, 4) |

Form table 1, it can be ascertained that MSUM (i.e. MSUM [0:31]) is the summation of MWSUM0[0:31]+MWSUM1[0:31]+ . . . +MWSUM15[0:31], and it can also be defined as MWSUM0[0:31] . . . MWSUM15[0:31], corresponding to the local motion vectors of each block in FIG. 7. This is just an example. The application of the local motion vector isn't limited.

Using this method, the amount of movement of each block can be obtained by calculating the local motion vector using the motion-identifying device MD, and whether the amount of movement of each block, individually or collectively, is larger than the predefined identification threshold can be determined.

In step 240, in the normal mode, an object-identifying model NPU is configured to determine whether an object in the motion-object block CROP is a predefined object, which may be, but is not limited to, an object of interest (such as a human, pet, robot vacuum, or another objects of interest). When the object-identifying model NPU determines that the object in the motion-object block CROP isn't a predefined object (i.e. it is not an object of interest), the motion-detection system 100 enters the low-power mode again, and the motion-object block CROP is transmitted to the pre-processor CCAP.

In an embodiment, the object-identifying model NPU is a well-trained neural-network processing unit, which is able to identify one or more kinds of objects.

In an embodiment, refer to FIG. 1. In the normal mode, the camera CAM transmits a color image to the camera interface CI. The camera interface CI transmits the color image to the pre-processor CCAP. The pre-processor CCAP doesn't process the color image and directly transmits the color image to the storage device ST. The processor controls the object-identifying model NPU to read the color image from the storage device ST and perform object identification. It can be seen that, in the normal mode, the calculation is performed directly on a color image that has not been light-weighted by the pre-processor CCAP. Thus, if all calculations are performed only in the normal mode, a larger amount of calculation and storage is required.

Switching between the low-power mode and the normal mode through steps 210~240 can maintain processing efficiency and save energy at the same time.

In an embodiment, when the object is a predefined object (such as human), this means that movement of human is detected, and the motion-object block CROP is transmitted to the predefined application APP (as shown in FIG. 1). For example, the application APP is configured to detect the active time of the human in a space. However, the application APP described in the present disclosure is not limited, the application APP may be any application configured to detect moving objects, and this is just one example.

In an embodiment, when the object-identifying model NPU determines that the object in the motion-object block CROP is not the predefined object, the motion-detection system 100 enters the low-power mode again, and the motion-object block CROP is transmitted to the pre-processor CCAP. The pre-processor CCAP masks the motion-object block CROP to generate a mask image and transmits the mask image to the storage device. The input image is replaced with the mask image (for example, the mask image replaces the input image in step 210, and subsequent steps are performed again).

In an embodiment, the more masked parts there are in the mask image, the fewer blocks in the input image need to be determined. Thus, the total amount of computation of the whole motion-detection system 100 is lower, the process speed is faster, and less storage space is required.

Based on the description above, the motion-detection system and the motion-detection method of the present disclosure can reduce the amount of computation through: performing various processes on a color image in the low-power mode using the pre-processor to generate a light-weighted input image (e.g. a sub-image), switching to normal mode only when the motion-identifying device determines that the input image contains a moving object, switching back to the low-power mode when an object which is able to be masked is found, and replacing the input image with the mask image. In this way, by performing an image pre-process in the low-power mode, the computation data is light-weighted, and the required power consumption of the whole system is reduced. Thus, the problems of calculation consumption and insufficient storage space are addressed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motion-detection system, comprising:
a camera, configured to capture a color image and transmit the color image to a pre-processor through a camera interface; wherein, in a low-power mode, the pre-processor retrieves a luminance value of each pixel in the color image to generate a luminance image and performs a resolution reduction on the luminance image to generate an input image; and
a storage device, configured to store the input image and transmit the input image to a motion-identifying device; wherein the motion-identifying device is configured to identify a motion-object block included in the input image;
wherein the motion-identifying device calculates an amount of movement of the motion-object block, and when the amount of movement reaches an identification threshold, a system wake-up signal is triggered so as to cause the motion-detection system to enter a normal mode from the low-power mode;

wherein, in the normal mode, when an object-identifying model determines that an object in the motion-object block is not a predefined object, the motion-detection system enters the low-power mode again, and the motion-object block is transmitted to the pre-processor;
wherein the pre-processor cuts the input image evenly into a plurality of sub-images and selects a predefined number of sub-images in a randomized manner to input to the storage device;
wherein the storage device is a low-power static random access memory, a memory, a hard disk, or a USB memory card;
wherein the motion-identifying device is implemented by software, firmware, or hardware, and the motion-identifying device comprises a computing electronic device.

2. The motion-detection system as claimed in claim 1, wherein the motion-identifying device is implemented by a chip or circuit.

3. The motion-detection system as claimed in claim 1, wherein the computing electronic device is a processor.

4. The motion-detection system as claimed in claim 1, wherein the motion-identifying device receives a first input image and a second input image, calculates an amount of difference between the first input image and the second input image, and regards the amount of difference as the amount of movement so as to identify the motion-object block within the input image and to mark a position of the motion-object block.

5. The motion-detection system as claimed in claim 4, wherein when the motion-identifying device determines that the amount of difference between the first input image and the second input image exceeds the identification threshold, the motion-identifying device triggers the system wake-up signal so as to cause the motion-detection system to enter the normal mode from the low-power mode.

6. The motion-detection system as claimed in claim 1, wherein the object-identifying model is a neural-network processing unit.

7. The motion-detection system as claimed in claim 1, wherein when the object-identifying model determines that the object in the motion-object block isn't the predefined object, the motion-detection system enters the low-power mode again, the motion-object block is transmitted to the pre-processor, and the pre-processor masks the motion-object block to generate a mask image and transmits the mask image to the storage device to replace the input image.

8. A motion-detection method, comprising:
capturing a color image using a camera and transmitting the color image to a pre-processor through a camera interface; wherein, in a low-power mode, the pre-processor retrieves a luminance value of each pixel in the color image to generate a luminance image and performs a resolution reduction on the luminance image to generate an input image; and
storing the input image using a storage device and transmitting the input image to a motion-identifying device; wherein the motion-identifying device is configured to identify a motion-object block within the input image;
wherein the motion-identifying device calculates the amount of movement of the motion-object block, and when the amount of movement reaches an identification threshold, a system wake-up signal is triggered so as to cause the motion-detection system to enter the normal mode from the low-power mode;
wherein, in the normal mode, when an object-identifying model determines that an object in the motion-object block is not a predefined object, the motion-detection system enters the low-power mode again, and the motion-object block is transmitted to the pre-processor; and wherein the pre-processor cuts the input image evenly into a plurality of sub-images and selects a predefined number of sub-images in a randomized manner to input to the storage device;

wherein the storage device is a low-power static random access memory, a memory, a hard disk, or a USB memory card;

wherein the motion-identifying device is implemented by software, firmware, or hardware, and the motion-identifying device comprises a computing electronic device.

9. The motion-detection method as claimed in claim 8, further comprising:

receiving, using the motion-identifying device, a first input image and a second input image, calculating an amount of difference between the first input image and the second input image, and regarding the amount of difference as the amount of movement so as to identify the motion-object block within the input image and to mark a position of the motion object block.

10. The motion-detection method as claimed in claim 9, further comprising:

when determining that the amount of difference between the first input image and the second input image exceeds the identification threshold using the motion-identifying device, triggering the system wake-up signal so as to cause the motion-detection system to enter the normal mode from the low-power mode.

\* \* \* \* \*